Patented May 1, 1951

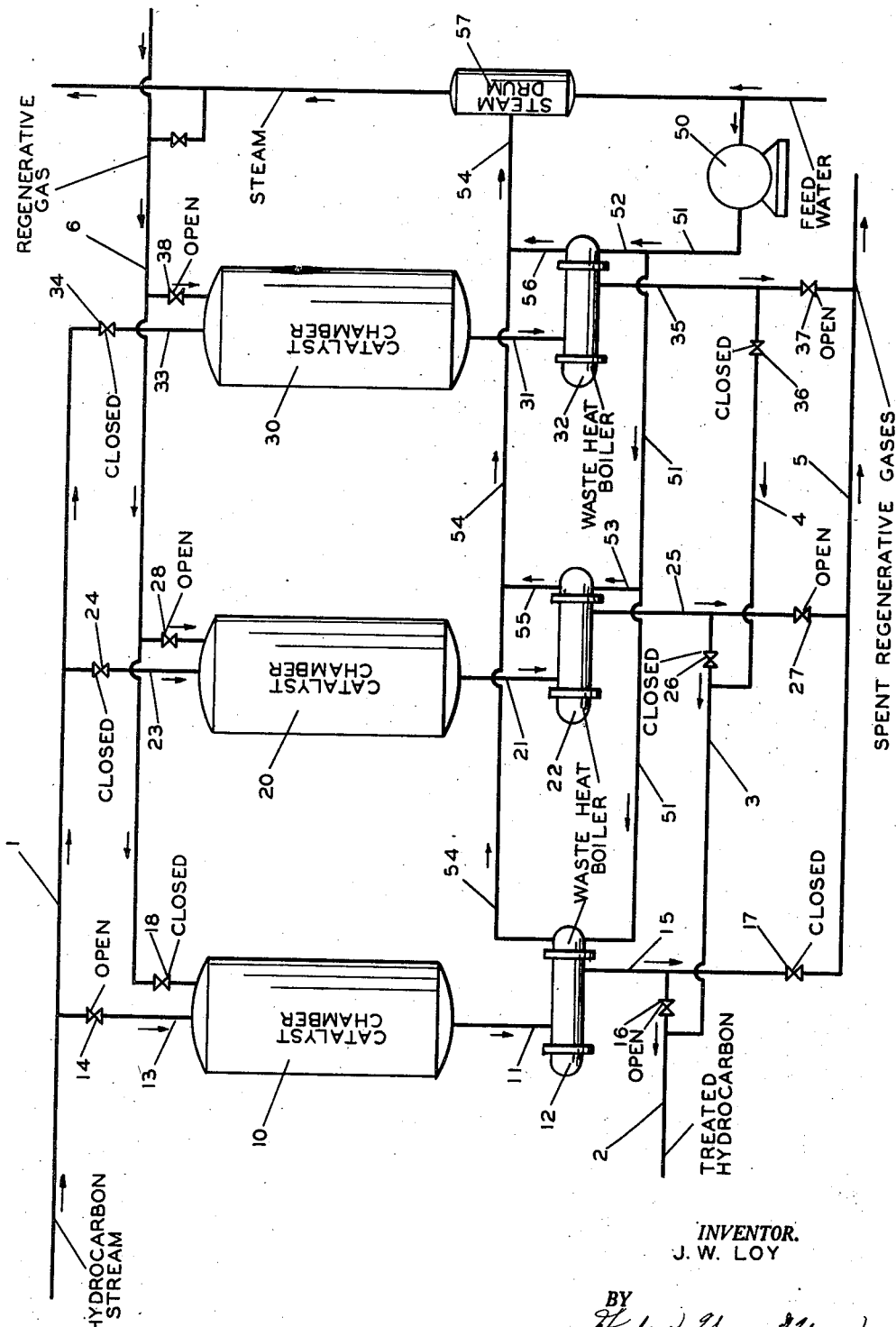

2,551,145

UNITED STATES PATENT OFFICE 2,551,145

CATALYTIC CRACKING SYSTEM

John W. Loy, Bartlesville, Okla., assignor to Phillips Petroleum Company, a corporation of Delaware Application April 13, 1943, Serial No. 482,920

1 Claim. (Cl. 23—288)

This invention relates to catalytic cracking systems which use stationary catalyst beds and require two or more individual catalyst chambers, so that, when one is in active operation ("on stream"), the other may be undergoing catalyst regeneration. More particularly the invention is concerned with providing waste heat boilers to quench the converted products when the chamber is on stream and to conserve the heat of the regenerative gases when the chambers are being regenerated.

It is usually desirable to install a waste heat boiler in line with the effluent spent regenerative gases to recover a portion of the heat liberated in burning off the carbon. On the other hand, separate apparatus must then be used to quench and cool the hydrocarbon effluent from the chamber on process. The valves and piping required for switching from process to regeneration and vice versa operate at high temperatures and are expensively constructed.

In the course of hydrocarbon conversions over solid contact catalysts, the catalysts ordinarily undergo progressive deactivation due to the accumulation of carbonaceous residue deposits thereon, making it imperative to reactivate the catalyst at regular intervals. It is customary to reactivate a degenerated catalyst by burning off the carbonaceous deposits. As a result of the exothermic heat of combustion developed in the course of catalyst reactivation, the catalyst mass and the chamber may be raised to temperatures within the range of about 1000° to 1500° F. The elevated temperatures are attained in the presence of free oxygen-containing fluids, such as air; and by virtue thereof, ordinary metals, when directly subjected to such temperatures deteriorate rather quickly. Moreover, high temperatures are required during the conversion period, and since the conversion is often endothermic, it is desirable to minimize heat losses in order to maintain an efficient rate of conversion.

In the conversion step, it is essential that the effluents leaving the conversion zone, be quenched immediately. If the temperature of the effluent is not immediately reduced, the cracking operation continues at the high temperature and pressure with an inferior product resulting. To cool the regenerative gases is necessary to conserve heat and to further lower their temperature so chambers, pipes and valves of special metal are not necessary.

It is one advantage of the present invention to provide a separate waste heat boiler for each catalytic chamber. This presents advantages over one common heat exchanger for all chambers in cutting down on the size of pipe necessary and other equipment with its consequence saving in cost. Further, any fluctuations occurring during change from the conversion step to the regenerative step will not be so material since two or more heat exchangers are always in operation. This is most material where the steam being generated is being used where constant supply is necessary. The individual waste heat boilers present no disadvantages over one common waste heat boiler, because in effect, they function as one waste heat boiler, in that water is started to circulate and flow through a closed system so that water gets to each waste heat boiler.

The main advantage of the present invention resides in cooling the hot products in the separate waste heat boilers before these hot products pass through any valves. Valves to withstand temperatures of 950° to 1400° F. and the pressures encountered in catalytic cracking are not available on the general market today. These valves must be assembled as special products with their attendant high cost. The cost of these special products are almost enough to make the whole process uneconomical. In the present process, the effluent from the conversion step or the spent regenerative gases are cooled to 700° F. in the waste heat boilers. At this temperature, any number of valves are available in the present day channels of commerce which will withstand this temperature and at a cost which is far below the cost of special valves designed for the higher temperatures.

It is a primary object of this invention to provide individual waste heat boilers for each catalytic chamber to either quench the effluents of the chambers on conversion or cool the spent regenerative gases of those chambers on regeneration.

Another object of this invention is to cool the products leaving the catalyst chambers before passing through any valves in order to be able to use valves designed for lower temperature and lower pressure operations.

Still another object of this invention is to provide individual waste heat boilers for each catalytic chamber to minimize the effect on a constant source of steam supply from the waste heat boilers when the catalyst chambers are changed from conversion to regeneration or vice-versa.

These as well as other objects and advantages will be readily apparent from an examination of the following detailed description taken in conjunction with the annexed drawing, wherein there is illustrated a preferred embodiment of the invention in diagrammatic form.

Referring to the drawing, three catalyst chambers are shown and are represented by the numerals 10, 20 and 30, respectively. Each catalyst chamber has outlet pipes 11, 21 and 31, respectively, which exit pipes connect into the waste heat boilers 12, 22 and 32, respectively. The hydrocarbon to be catalytically converted is conducted to the catalyst chambers through the pipe 1; with the pipe 13 having the valve 14 therein leading to the catalytic chamber 10; the pipe 23 having the valve 24 leading to the catalytic chamber 20; and the pipe 33 having the valve 34 leading to the catalytic chamber 30.

Outlet pipe 15 leads from the waste heat boiler 12; outlet pipe 25 leads from the waste heat boiler 22 while the pipe 35 leads from the waste heat boiler 32. When the chambers are on conversion, the pipe 15 has a branch pipe 2 with a valve 16 into which it connects; pipe 25 connects into branch pipe 3 having valve 26 and pipe 3 then connects into pipe 2 past valve 16; and pipe 35 connects into branch pipe 4 having valve 36 and pipe 4 then connects into pipe 3 past valve 26. When the chambers are on regeneration, the pipes 15, 25 and 35, respectively, are continued by the branch pipes 2, 3 and 4, respectively, and have valves 17, 27 and 37, respectively, in the continuations of pipes 15, 25 and 35. Pipes 17, 27 and 37 connect into pipe 5 which pipe delivers the spent regenerative gases either to be vented or as recycle gas with the regenerative gas.

Regenerative gas is supplied to the catalyst chambers through the supply pipe 6 which regenerative gas passes through the valves 18, 28 and 38, respectively, into the chambers 10, 20 and 30, respectively. Feed water is supplied through the pump 50, line 51 and branch pipe 52 to waste heat boiler 32. Branch pipe 53 leads from main pipe 51 and conducts feed water to the waste heat boiler 22 while pipe 51 terminates in waste heat boiler 12. Steam leaves the waste heat boilers through the line 54; branch line 55 connects waste heat boiler 22 with line 54 and conducts steam from waste heat boiler 22 to the line 54; and branch line 56 connects waste heat boiler 32 to the line 54 and conducts steam from the waste heat boiler 32 to the line 54. The steam is delivered by line 54 to the steam drum 57 from where it is delivered for any plant purpose desired or may be put into the regenerative gas as a diluent.

In describing the operation of the process, it will be described as shown in the figure of the drawing; namely, catalyst chamber 10 on conversion and chambers 20 and 30 on regeneration. The hydrocarbon stream to be catalytically converted enters the process through the pipe 1. Valve 14 is open while valves 24 and 34 are closed, hence the hydrocarbon passes through pipe 13 into the catalyst chamber 10. The converted product leaves the chamber 10 through the pipe 11 and is quenched in waste heat boiler 12 by giving up some of its heat to the water from line 51 entering waste heat boiler 12. The cooled conversion product leaves the waste heat boiler 12 through the line 15. The valve 17 is closed while the valve 16 in pipe 2 is open, hence the converted product passes through line 2 to further treatment or storage. During this cycle of operation for chamber 10, the valve 18 is closed. When it becomes necessary to regenerate the catalyst in chamber 10, the valve 14 is closed along with the valve 16 and valves 18 and 17 are opened.

Chamber 20 is undergoing regeneration, hence valve 24 is closed and the valve 28 open. Further the valve 26 is closed while the valve 27 is open. The regenerative gas enters the chamber 20 and the spent regenerative gas leaves the chamber through pipe 21, passes through the waste heat boiler 22, through line 25 to line 5. The operation of chamber 30 is similar to chamber 20 since it is undergoing regeneration as shown in the drawing.

It is to be understood that as many catalytic chambers as desired may be used and how many of the chambers are on conversion and how many are on regeneration is solely up to the operator; and further the time before the catalyst becomes spent and the length of time required for regeneration.

From the foregoing, it is believed that the method and apparatus of the present invention will be readily comprehended by persons skilled in the art. It is to be clearly understood, however, that various changes in the apparatus herein shown and described and in the method of fabricating the same, as outlined above, may be resorted to without departing from the spirit of the invention as defined by the appended claim.

I claim:

A catalytic hydrocarbon conversion system comprising a plurality of catalyst chambers containing conversion catalyst disposed therein, means for introducing hydrocarbon fluid to be converted into each chamber during the conversion reaction, means for introducing regenerating fluid into each chamber after the catalyst has become spent, outlet means for removing hot fluid from each chamber, means for alternating flow of hydrocarbon and regenerating fluids into each chamber to permit alternate conversion and regeneration, a separate waste heat boiler attached directly and immediately adjacent to the outlet of each catalyst chamber whereby each waste heat boiler is alternately used to quench said conversion effluent and to cool effluent gases from said regeneration by indirect heat exchange respectively as each catalyst chamber is employed for conversion and on regeneration, a common piping means connecting each waste heat boiler in parallel and conducting water into each waste heat boiler in indirect heat exchange with the respective effluents from the conversion and regeneration reactions to effect quenching of said effluents therein, common piping means connected to outlets in each of said waste heat boilers for removing steam generated therein therefrom, separate outlets connected with each waste heat boiler for removing cooled hydrocarbon fluids and regenerating gas, respectively, and means for introducing steam removed from said waste heat boilers into said regenerating fluid as a diluent therefor.

JOHN W. LOY.

REFERENCES CITED

The following references are of record in the file of this patent:

UNITED STATES PATENTS

| Number | Name | Date |
|---|---|---|
| 2,073,638 | Houdry | Mar. 16, 1937 |
| 2,254,555 | Thomas | Sept. 2, 1941 |
| 2,304,653 | Pyzel et al. | Dec. 8, 1942 |
| 2,322,984 | Watson | June 29, 1943 |
| 2,357,332 | Kelly | Sept. 5, 1944 |
| 2,388,536 | Gunness | Nov. 6, 1945 |